July 19, 1960   R. A. FINDLAY   2,945,903
FRACTIONAL CRYSTALLIZATION PROCESS AND APPARATUS
Filed Dec. 26, 1956
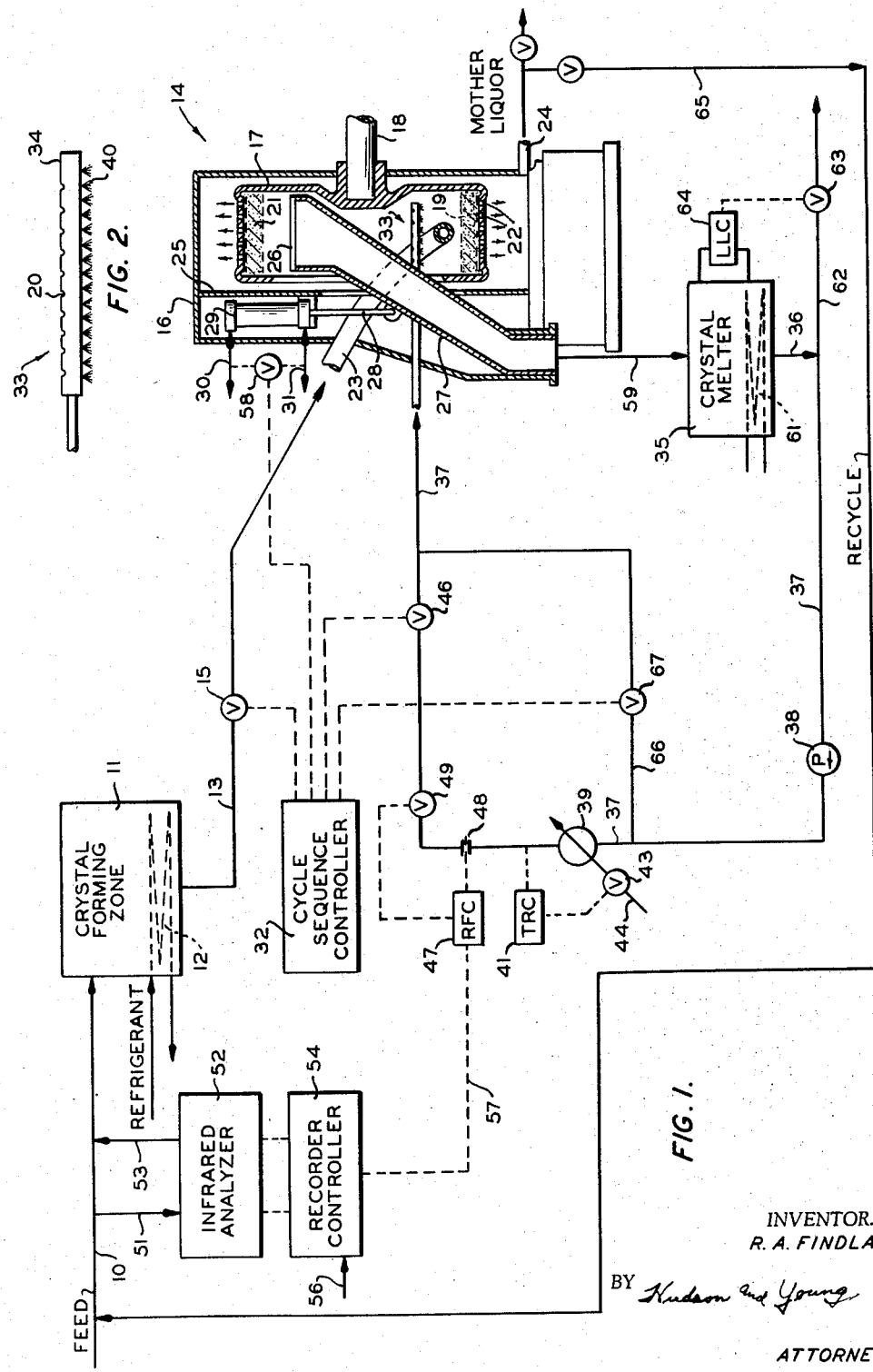
INVENTOR.
R. A. FINDLAY
BY Hudson and Young
ATTORNEYS

United States Patent Office 2,945,903
Patented July 19, 1960

2,945,903
FRACTIONAL CRYSTALLIZATION PROCESS AND APPARATUS

Robert A. Findlay, Bartlesville, Okla., assignor to Phillips Petroleum Company, a corporation of Delaware Filed Dec. 26, 1956, Ser. No. 630,661

9 Claims. (Cl. 260—674)

This invention relates to the separation and purification of components of a liquid multi-component mixture. In one aspect, it relates to the separation and purification of liquid multi-component mixtures by fractional crystallization. In another aspect, it relates to an improved apparatus for use in processes for crystal separation and purification from liquid mixtures.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities, or materials having relatively high boiling ranges, or thermally unstable substances, separation by crystallization may well be the only method which can be advantageously employed.

As well as offering perhaps the only practical method of separation, the crystallization method has the further advantage of being the only separation method which theoretically gives a pure product in a single stage of operation. In actual practice, however, the crystals obtained from a solution of several components will be impure because of the occlusion of mother liquor within the crystal interstices. In conventional processes, the crystals are often separated from mother liquor by means of centrifugation. Such processes are often conducted in two or more stages in order to obtain a purer product, the crystal yield from a first centrifuge being remelted and again crystallized and then centrifuged to effect further purification. In this type of process, the purity of the product is limited by the number of stages through which the process is carried. In accordance with the present invention a crystal purification method is provided whereby a high purity product is obtained in a single stage centrifugation.

It is an object of this invention to provide an improved method for the separation of components of liquid mixtures.

Another object of the invention is to provide an improved system for crystal purification.

A further object of the invention is to provide an improved method for purifying crystals by centrifugation.

Other and further objects and advantages of the invention will become apparent to one skilled in the art upon consideration of the accompanying disclosure.

In accordance with a broad aspect of the present invention, there is provided, in a process which comprises centrifuging a slurry of crystals in mother liquor so as to remove mother liquor therefrom and form a cake of said crystals, and recovering said crystals as a product of the process, the improvement comprising melting at least a portion of said recovered crystals, and prior to recovering said crystals supplying a portion of the resulting melt to the surface of the crystal cake while centrifuging said crystal cake.

In another embodiment of the invention, a liquid multi-component mixture is cooled to near its eutectic temperature so as to form a slurry of crystals of one of the components in mother liquor. The slurry is then fed to a basket centrifuge wherein a crystal cake is formed by centrifugation. After formation of the crystal cake, it is contacted with hot reflux liquid, e.g., crystal melt heated to a temperature between 100 and 250° F. above the melting point of the pure product. The reflux liquid passes into the crystal cake, refreezing on the crystals and thereby displacing occluded mother liquor. The purified crystals are then removed from the centrifuge as a product of the process.

The process and apparatus of the invention are applicable to a vast number of simple binary and complex multi-component systems. The invention is particularly applicable to the separation of hydrocarbons which have practically the same boiling points and are, therefore, difficult to separate by distillation. Where high boiling organic compounds are concerned, separation by distillation is often undesirable because many such compounds are unstable at high temperatures. One particularly advantageous application of the process lies in the purification of a component of, for example, 15 to 25 percent purity so as to effect a purity of 98 percent or higher. In order to illustrate some of the systems to which the invention is applicable, the following compounds are grouped with respect to their boiling points:

| Group A | B.P., °C. | F.P., °C. |
|---|---|---|
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B.P., °C. | F.P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P., °C. | F.P., °C. |
|---|---|---|
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B.P., °C. | F.P., °C. |
|---|---|---|
| Aniline | 184.4 | −6.2 |
| Toluene | 110.8 | −95 |
| Benzene | 80.0 | 5.5 |

| Group E | B.P., °C. | F.P., °C. |
| --- | --- | --- |
| Carbon tetrachloride | 77 | −22.8 |
| Chloroform | 61 | −63.5 |
| CS₂ | 46.3 | −108.6 |
| Acetone | 56.5 | −95 |

| Group F | B.P., °C. | F.P., °C. |
| --- | --- | --- |
| Ortho-xylene | 144 | −27.1 |
| Meta-xylene | 138.8 | −47.4 |
| Para-xylene | 138.5 | 13.2 |

| Group G | B.P., °C. | F.P., °C. |
| --- | --- | --- |
| Ortho-cymene | 175.0 | −73.5 |
| Meta-cymene | 175.7 | <−25 |
| Para-cymene | 176.0 | −73.5 |

| Group H | B.P., °C. | M.P., °C. |
| --- | --- | --- |
| Dimethyl phthalate | 282 | 5.5 |
| Dimethyl isophthalate | 124 (12 mm.) | 67 |
| Dimethyl terephthalate | 288 | 140.6 |

| Group I | B.P., °C. | M.P., °C. |
| --- | --- | --- |
| Ortho-nitrotoluene (α) | 222.3 | −10.6 |
| Ortho-nitrotoluene (β) | — | −4.1 |
| Meta-nitrotoluene | 231 | 15.5 |
| Para-nitrotoluene | 238 | 51.3 |

Mixtures consisting of any combination of two or more of the components within any one of the groups can be resolved by the process of the invention, as can mixtures made up of components selected from different groups. For example, benzene can be separated from a benzene-n-hexane or a benzene-n-heptane mixture in which the benzene is present in an amount greater than the eutectic concentration. In the same manner, para-xylene may be readily separated from a mixture of para- and meta-xylenes or from para-, meta-, or ortho-xylenes. Benzene can also be separated from a mixture thereof with toluene and/or aniline. Multi-component mixtures which can be effectively resolved so as to recover one or more of the components in substantially pure form include mixtures of at least two of 2,2-dimethylpentane, 2,4-dimethylpentane, and mixtures of at least two of carbon tetrachloride, chloroform, and acetone. The invention is also applicable to the separation of individual components from a system of cymenes.

This invention can also be utilized to purify naphthalene, hydroquinone, (1,4-benzenediol), paracresol, para-dichlorobenzene, and such materials as high melting waxes, fatty acids, and high molecular weight normal paraffins. The invention can also be used to resolve a mixture comprising anthracene, phenanthrene, and carbazole. Furthermore, the invention can be used to separate durene (1,2,4,5-tetramethylbenzene) from $C_{10}$ aromatics.

It is not intended, however, to limit the invention to organic mixtures, but rather it is applicable to inorganic mixtures as well, and offers a practical method of separating two inorganic components between which solvates or hydrates are formed. Examples of inorganic systems to which this invention is applicable are those for the recovery of pure salts, such as ammonium nitrate, and of anhydrous salts from their hydrates.

In certain cases, it is also desirable to recover the mother liquor separated from the crystals as a product of the process. This situation arises when it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple, and tomato. It is also possible to concentrate vegetable juices and beverages such as milk, beer, wine, coffee, and tea by this method. The desired degree of concentration can be controlled by varying the amount of reflux liquid returned to the crystal cake. This aspect of the invention is in general applicable in those instances where it is desired to increase the concentration of a solution by removing at least a portion of the solvent therefrom.

For a more complete understanding of the invention, reference may be had to the following description and the drawing, in which:

Figure 1 is a flow diagram, illustrating diagrammatically one modification of the invention; and Figure 2 is an elevational view showing a novel distributor which is used to supply reflux liquid to the centrifuge.

Referring now to Figure 1 of the drawing, a liquid feed mixture, which may be a liquid multi-component mixture containing components of different melting points, is introduced through line 10 into crystal forming zone 11. A refrigerant is circulated through coil 12 positioned within the crystal forming zone at a temperature and at a rate sufficient to maintain this zone at a temperature low enough to crystallize one of the components of the multi-component mixture. It is to be understood that it is not intended to limit the invention to any particular means for forming crystals, for any suitable refrigeration means adapted to lower the temperature of a liquid mixture can be employed. The slurry of crystals in mother liquor which is formed in zone 11 is withdrawn through line 13 containing flow control means 15 and then passed into centrifuge 14.

As shown in the drawing, centrifuge 14 comprises an outer shell or housing 16 having positioned therein a rotatable basket or drum 17. Basket or drum 17 rotates with shaft 18 which is connected to a motor, not shown. A suitable filter medium 19 is positioned adjacent the inner surface of the drum wall so as to retain solid materials 21 therein while allowing mother liquor to pass through perforations 22 into housing 16. Feed pipe 23 provides means for introducing a slurry of crystals into basket 17 while pipe 24 is for the withdrawal of mother liquor from the lower part of housing 16. Within housing 16, there is located a dividing plate 25. A scraper or knife 26, which is attached to chute 27, provides means for removing filter cake from the centrifuging basket. Chute 27 is connected by means of connecting rod 28 to a piston contained in hydraulic cylinder 29. Lines 30 and 31 connected to hydraulic cylinder 29 provide means for introducing a hydraulic fluid into the cylinder and withdrawing the fluid therefrom so as to move the piston positioned therein. There is thus provided means for moving knife 26 into contact with the crystal cake contained in the basket of the centrifuge and thereby remove the solid material from the centrifuge through chute 27. It is noted that one side of centrifuge basket 17 is provided with an enlarged opening which allows the basket to rotate around chute 27 and feed pipe 23.

Distributor 33 provides means for supplying reflux liquid to the centrifuge basket. While any suitable distributor can be employed, it is preferred to use one having the structure shown in the drawing. A clearer understanding of the structure of the distributor can be obtained by referring to Figure 2 of the drawing. As shown in this figure, the distributor comprises a pipe 34 closed at one of its ends. The upper side of pipe 34 is provided with perforations 20 while the underside of the pipe has a plurality of downwardly extending fibers or bristles 40 attached thereto. On entering pipe 34, the pipe and onto fibers 40 which conduct the liquid onto the filter cake at an innumerable number of points. In reflux liquid flows out of perforations 20 down around this manner, the reflux liquid is distributed evenly across the entire filter cake and is not concentrated on any one portion of the cake.

Centrifuge 14 has associated therewith a cycle sequence controller 32 which is operatively connected to various valves as will be discussed more in detail hereinafter. The centrifuge described hereinabove and the sequence controller employed therewith can be commercially available items of manufacture. One suitable type of centrifuge is the type HS Baker Perkins centrifuge manufactured by Baker Perkins, Inc., Saginaw, Michigan. This particular machine is supplied with a timer mechanism which can be employed as the controller to adjust the various valves as described herein.

The slurry of crystals and mother liquor withdrawn from crystal forming zone 11 through line 13 is passed into centrifuge basket 17 through feed pipe 23. As a result of the rotation of basket 17 at a constant uniform speed, mother liquor contained in the slurry is thrown out through perforations 22 into housing 16. The mother liquor, which settles into the bottom of the housing, is withdrawn therefrom through line 24. Slurry is supplied to the centrifuge basket until the bed of solids therein has risen to a desired level after which valve 15 in line 13 is closed through the operation of sequence controller 32. The period during which the slurry is supplied to the centrifuge is dependent upon several factors, including the capacity of the centrifuge and the solids content of the slurry supplied to the centrifuge. After formation of the crystal cake in the centrifuge basket, the cake is contacted with a reflux liquid which is supplied thereto through distributor 33.

The reflux liquid with which the crystal cake is contacted is substantially pure product which was formed during a previous cycle of operation. This liquid is withdrawn from crystal melter 35 through line 36 and then passed through line 37 to distributor 33. Pump 38 contained in line 37 provides means for flowing the liquid from the crystal melter through line 37 to the distributor. Prior to entering distributor 33, the reflux liquid passes through an indirect heat exchanger 39 wherein it is heated to a desired temperature. The temperature of the reflux liquid is maintained at a desired level through the operation of temperature recorder-controller 41 which is operatively connected to a temperature sensing element, such as a thermocouple, in line 37 and to a flow control means, such as motor valve 43, in heating fluid inlet line 44. The recorder-controller adjusts valve 43 so that heating fluid is supplied to the heat exchanger at a rate such that the reflux liquid is heated therein to a desired extent. The temperature of the reflux liquid is usually controlled so that it is introduced into the centrifuge basket at a temperature of between about 100 and 250° F., preferably between about 150 and 200° F., above the melting point of the pure product. In some cases, the reflux liquid can be at a temperature as high as the boiling point of the pure product and it is also within the scope of the invention to introduce this material into the centrifuge as a vapor. If it is introduced in the vapor phase, the amount of reflux required is considerably reduced because of additional heat supplied to the filter cake in the form of latent heat of condensation. The amount of reflux liquid charged to the centrifuge is usually in the range of 5 to 20, preferably 10 to 15, weight percent of the total filter cake. In general, the reflux liquid is introduced into the centrifuge at a temperature and in an amount such that the final temperature of the centrifuge cake after contact with the hot reflux liquid is still at a temperature at least below the melting point of the pure product, e.g., from 10 to 15° F. below the melting point. It is important that the reflux liquid be heated prior to its introduction into the centrifuge. If the liquid is used without prior heating, there is a tendency for the surface of the filter cake to become plugged and thereby prevent the flow of reflux into the cake so that the desired displacement of mother liquor does not occur. However, by heating the reflux liquid as described herein, plugging of the filter cake as a result of the liquid freezing on the surface of the cake is prevented. When the desired amount of reflux liquid has been supplied to distributor 33, sequence controller 32 operates to close valve 46 in line 37 and thereby terminate flow of reflux liquid therein.

The rate at which reflux liquid flows through line 37 is controlled by rate of flow controller 47 which is operatively connected to an orifice 48 in line 37 and to a flow control means, such as motor valve 49, in this same line. The rate of flow controller is given an initial setting such that during a predetermined period the desired amount of reflux liquid, as discussed hereinabove, is supplied to the filter cake. It sometimes happens that variations in the feed composition occur so that the amount of solids contained in the slurry recovered from crystal forming zone 11 also varies. As a result, the amount of solid materials contained in the centrifuge basket changes, and it becomes necessary to vary the amount of reflux liquid supplied to the centrifuge. In order that any changes in feed composition may be immediately detected, a sample of the feed stream is withdrawn from line 10 through line 51 and passed into infrared analyzer 52. Line 53 provides means for withdrawing the sample from the analyzer and returning same to feed line 10. Any suitable infrared analyzer can be employed in the practice of the present invention, and one type of instrument which can be advantageously utilized is described in U.S. Patent No. 2,579,825 issued to J. W. Hutchins on December 25, 1951. It is to be understood, however, that it is not intended to limit the invention to any particular type of analytical instrument, for any instrument capable of giving a continuous analysis of a feed stream, e.g., a differential refractometer, can be employed.

The output signal from analyzer 52 is applied to potentiometer recorder-controller 54 which is supplied with a source of input air through line 56. Controller 54 provides a regulated output air pressure in line 57 which is proportional to the signal from analyzer 52. Rate of flow controller 47 is provided with a pneumatic set mechanism. The output air pressure in line 57 is applied to the pneumatic set mechanism of the rate of flow controller, which in turn adjusts the set point of the rate of flow controller. Since controller 54 provides a regulated output air pressure in line 57 which is proportional to the signal from analyzer 52, the pressure in line 57 is proportional to the amount of the component to be purified, which is contained in the feed stream. Thus, the index setting of rate of flow controller 47 is increased in an amount corresponding to any increase in concentration of the component to be purified in the sample stream above a preselected value. Conversely, the index setting of controller 47 is decreased when the concentration of the component to be purified falls below a preselected value. In this manner, the rate at which reflux liquid is supplied to the centrifuge is varied so as to correspond at all times to the composition of the feed stream, which in turn determines the amount of solid materials contained in the centrifuge basket.

As previously mentioned, the hot reflux liquid on entering the centrifuge is distributed evenly over the surface of the filter cake by means of distributor 33. It is to be understood that during the period of introduction of reflux liquid, the centrifuge basket is rotating. The hot reflux liquid on contacting the filter cake melts a portion of the outer layers of the cake, forming a wash of intermediate purity at a temperature above that of the cake. As noted hereinbefore, the final temperature of the filter cake after contact with the liquid is still below the melting point of the pure product. The composition of the liquid entering the cake as a result of supplying the reflux liquid thereto varies during the time of refluxing from an initial leaner mixture to a subsequent richer mixture. On entering the filter cake, the reflux liquid refreezes on the crystals, displacing occluded liquid therefrom. This displaced liquid, which has a lower freezing temperature than the reflux liquid or the pure product, passes through the filter cake and is subsequently removed therefrom through perforations 22. Since the reflux liquid which refreezes on the crystals in the filter cake has substantially the same composition as that of the pure product, it is seen that the composition of the filter cake after displacement of occluded mother liquor is very nearly the same as that of the pure product.

After completion of the reflux cycle, sequence controller 32 actuates valve 58 so that hydraulic fluid is supplied to hydraulic cylinder 28 through line 31. As a result, the piston in hydraulic cylinder 28 moves upwardly therein. Since connecting rod 28 is connected to the piston and to chute 27, the chute carrying knife 26 is also moved upwardly. On moving upwardly, knife 26 contacts the filter cake, and because of the spinning action of the centrifuge basket, solid material is scraped or peeled from the filter cake and falls into chute 27. This solid material is removed from the chute through line 59 and then passed into crystal melter 35. The crystal melter is provided with a suitable heating coil 61 through which a heating fluid is circulated at a temperature and a rate sufficient to cause the solid material to be melted. As discussed hereinbefore, a portion of the melted material formed in the crystal melter is recycled to the centrifuge basket through line 37 as reflux liquid. The remainder of the melt which is withdrawn from the crystal melter through line 36 is recovered through line 62 as a product of the process. The rate at which product is withdrawn through line 62 is controlled by means of valve 63 contained in that line. Valve 63 is operatively connected to liquid level controller 64 which is in turn operatively connected to crystal melter 35. The liquid level controller operates valve 63 so that liquid is withdrawn at a rate such that a predetermined level will be maintained within the crystal melter. The product recovered through line 62 can contain in excess of 98 weight percent of the component being purified.

At the end of the period required for the scraper to remove all of the filter cake from the centrifuge basket, sequence controller 32 adjusts valve 58 so that hydraulic fluid is now introduced into hydraulic cylinder 28 through line 30 and withdrawn therefrom through line 31. The piston contained in the cylinder is thereby moved downwardly, carrying with it connecting rod 28 and attached chute 27. Thereafter, the sequence controller operates to open valve 15 contained in line 13, and a crystal slurry is supplied to the centrifuge as discussed hereinbefore.

During start-up of the process, it is often desirable to recycle the mother liquor recovered through line 24 to feed line 10. This is accomplished by means of line 65 which is connected to line 24 and line 10. Since the mother liquor recovered through line 24 during the initial start-up period often contains a high percentage of the component to be separated, it is then advantageous to recycle this material to the feed line. When the process is producing high purity product, however, the mother liquor is recovered as a product of the process.

In accordance with another embodiment of the invention, a small amount of cold reflux liquid is supplied to the centrifuge basket immediately after introduction of the hot fluid. The addition of a small amount of cold reflux in this manner assists in the control of the process and completes the reflux phase of the operation with a minimum of danger of melting out the cake contained in the centrifuge basket. Line 66 connected to line 37 around heater 39 provides means for introducing the cold reflux liquid into the centrifuge. The sequence controller operates to open valve 67 contained in line 66 after closure of valve 46 in line 37 and maintains this valve in an open position for a predetermined time. Since the liquid flowing in line 66 by-passes heater 39, it is seen that this liquid is at about the temperature of the melt in crystal melter 34, e.g., at about the melting point of the component being purified. In general, it is preferred that the temperature of the cold reflux be in the range of 0 to 20° F. above the melting point of the pure product. After a small amount of the cold reflux, e.g., from 1 to 5 weight percent of the filter cake, has been added, the sequence controller operates to close valve 67 in line 66. Thereafter, the filter cake is removed from the centrifuge as discussed hereinabove.

A more comprehensive understanding of the invention can be obtained by referring to the following illustrative examples which are not intended, however, to be unduly limitative of the invention.

*Example I*

Apparatus similar to that illustrated in the drawing is used in the purification of para-xylene. A feed material comprising 55.2 weight percent para-xylene, the impurities being primarily ortho- and meta-xylenes and ethylbenzene, is pumped into the crystal forming zone wherein it is cooled to a temperature of about −10° F. The resulting crystal slurry containing about 30 weight percent solids is passed from the crystal forming zone into the basket of the centrifuge. Approximately 100 pounds of slurry of para-xylene crystals in mother liquor is fed to the centrifuge wherein mother liquor is removed as a result of rotation of the centrifuge basket. The resulting filter cake in the centrifuge basket contains about 75 percent solids, the remainder being occluded mother liquor. Only a very short spinning time is required in order to effect this separation since the purity of the product depends upon the reflux liquid rather than on a high centrifugal force to remove mother liquor.

The filter cake weighs about 40 pounds of which about 84 percent is para-xylene. Reflux liquid, which contains about 98.5 percent para-xylene, is next supplied to the centrifuge. Prior to its introduction into the centrifuge, the reflux liquid is heated to a temperature of about 256° F. This hot reflux liquid melts a portion of the outer layers of the filter cake, forming a wash of intermediate purity at a temperature above that of the cake. Actually, the composition of the wash liquid varies during the time of refluxing from an initial leaner mixture to a subsequent richer mixture. It is important that this hot liquid be distributed evenly and thoroughly over the cake since channeling could result if a large quantity of the liquid is placed on any one localized spot. After reflux liquid has been added, about 1.5 pounds of a cold wash is charged to the centrifuge at a temperature about equal to the freezing point of the pure product, i.e., about 55° F. The addition of the cold reflux liquid completes the reflux phase of the process with a minimum of danger of melting out the filter cake. The filter cake is then removed from the centrifuge by means of the knife and chute and passed into a melter wherein it is melted. The temperature of the material recovered from the centrifuge is about 36° F. while the melted product has a temperature of about 55° F. The product stream recovered from the crystal melting zone has a purity of about 98.5 weight percent para-xylene. Approximately 100 percent of the solids supplied to the centrifuge is recovered as a product of the process. This is possible since the rich para-xylene reflux liquid refreezes in the interstices of the crystal cake squeezing out the mother liquor quantitatively by filling up the pores with solid para-xylene. Accordingly, the reflux liquid is not lost to the process but is recovered along with the filter cake.

*Example II*

In this example, a feed material comprising 60.5 weight percent para-xylene, the impurities being primarily ortho- and meta-xylene and ethyl benzene, is cooled to a temperature of about −20° F. About 100 pounds of the resulting crystal slurry containing about 42 weight percent solids is charged to the centrifuge. After the initial spinning, the resulting filter cake contains about 85 percent solids. Four pounds of reflux liquid preheated to a temperature of 256° F. is applied to the filter cake which weighs about 49 pounds. Thereafter, one pound of reflux liquid at a temperature of 56° F. is introduced into the centrifuge. During the refluxing operation, the filter cake is warmed to about 16° F. and is discharged to the melter at this temperature. In the melter, the filter cake is heated to about its melting point. A stream containing 99.0 weight percent para-xylene is withdrawn from the crystal melter as a product of the process.

The control instruments utilized in the practice of the present invention can be commercially available items, such as those manufactured by the Foxboro Company, Foxboro, Mass., or Brown Instrument Company, Philadelphia, Pennsylvania. For example, in Bulletin 450 of the Foxboro Company, instruments are illustrated and described which can be suitably employed. Thus, the temperature recorder-controller, the rate of flow controller, and the pneumatic set mechanism referred to herein can be, respectively, a Model 40 Controller, a Model 40 Indicating Controller, and a Model 40 Pneumaticset as shown on pages 52, 62, and 55 of the aforementioned Foxboro Bulletin. A potentiometer recorder-controller which can be advantageously used is shown in Brown Instrument Company Bulletin 15-4.

Variations and modifications of the invention will become apparent to those skilled in the art upon consideration of the foregoing disclosure. Such variations and modifications are believed to come within the spirit and scope of the invention.

I claim:

1. In a process for separating a component from a liquid multicomponent mixture which comprises introducing said mixture into a crystal forming zone, cooling said mixture in said zone so as to form a slurry of crystals of said component in mother liquor, centrifuging said slurry so as to remove mother liquor therefrom and form a cake of said crystals, and recovering said crystals as a product of the process, the improvement comprising melting at least a portion of said recovered crystals; heating a portion of the resulting melt to a temperature in the range from 100° to 250° F. above the melting point of said component; prior to recovering said crystals, supplying heated melt to the surface of said crystal cake at a predetermined rate while centrifuging said cake; continuously measuring the concentration of said component in said mixture; and adjusting the rate at which said heated melt is supplied to said crystal cake in direct proportion to and in response to variations in said measured concentration of said component in said mixture.

2. The process of claim 1 in which said portion of said resulting crystal melt is heated to a temperature between about 150° F. and about 200° F. above the melting point of said component.

3. The process of claim 1 in which the amount of heated melt supplied to said crystal cake is in the range of 5 to 20 weight percent of said crystal cake.

4. The process of claim 1 in which the amount of heated melt supplied to said crystal cake is in the range of 10 to 15 weight percent of said crystal cake.

5. A process according to claim 1 wherein said multicomponent mixture is a mixture of xylenes and the component crystallized is para-xylene.

6. A process according to claim 1 wherein said crystals are ice crystals.

7. A process according to claim 3 wherein, after said heated melt has been supplied to said crystal cake, additional melt at a temperature in the range from 0 to 20° F. above the melting point of said crystals is likewise supplied to said crystal cake in an amount from 1 to 5 weight percent based on the weight of said crystal cake.

8. Apparatus for separating a component from a liquid multicomponent mixture which comprises, in combination, a crystal forming means; a feed inlet line connected to said crystal forming means; a slurry outlet line connected to said crystal forming means; a centrifuge comprising a housing, a rotatable perforated drum positioned in said housing, means for removing solid material from said rotatable drum, feed inlet means communicating with the interior of said drum, and connected to said slurry outlet line, a liquid distributing means communicating with the interior of said drum, and a first liquid outlet means connected to said housing; a crystal melting means connected to said solid material removal means of said centrifuge; a heating means connected to said crystal melting means; second liquid outlet means connected to said heating means; conduit means connected to said second liquid outlet means and to said liquid distributing means of said centrifuge and means for controlling the rate of flow of liquid in said conduit means in accordance with the concentration of said component in said mixture in said feed inlet line connected to said crystal forming means.

9. The apparatus of claim 8 in which a by-pass line is connected around said heating means to said conduit means.

References Cited in the file of this patent

UNITED STATES PATENTS

| 1,230,099 | Bingham | June 19, 1917 |
|---|---|---|
| 2,164,432 | Selwyn | July 4, 1939 |
| 2,750,433 | LeTourneau et al. | June 12, 1956 |
| 2,795,634 | Hoff et al. | June 11, 1957 |
| 2,795,635 | McBride | June 11, 1957 |
| 2,810,772 | Bennett et al. | Oct. 22, 1957 |
| 2,827,503 | Kennel et al. | Mar. 18, 1958 |
| 2,854,494 | Thomas | Sept. 30, 1958 |

FOREIGN PATENTS

| 10,838 | Switzerland | Sept. 12, 1895 |